United States Patent
Tanaka et al.

(10) Patent No.: US 7,263,244 B2
(45) Date of Patent: Aug. 28, 2007

(54) OPTICAL MODULATOR

(75) Inventors: Takehito Tanaka, Kawasaki (JP); Masaharu Doi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/320,699

(22) Filed: Dec. 30, 2005

(65) Prior Publication Data
US 2007/0003180 A1 Jan. 4, 2007

(30) Foreign Application Priority Data
Jun. 30, 2005 (JP) .............................. 2005-191092

(51) Int. Cl.
*G02F 1/035* (2006.01)
(52) U.S. Cl. ...................... 385/2; 385/4; 385/8; 385/14
(58) Field of Classification Search ................ 385/2–4, 385/8–9, 14, 16, 39, 40; 359/237, 245, 247, 359/254
See application file for complete search history.

(56) References Cited

U.S. PATENT DOCUMENTS 6,647,158 B2 * 11/2003 Betts et al. ..................... 385/2
6,674,927 B2 * 1/2004 Ibukuro ......................... 385/3
6,934,448 B2 * 8/2005 Akashi et al. ................ 385/49
2003/0138179 A1 * 7/2003 Akiyama et al. .............. 385/2

FOREIGN PATENT DOCUMENTS

JP           2002-287103           10/2002

* cited by examiner

*Primary Examiner*—Frank G. Font
*Assistant Examiner*—Hung Lam
(74) *Attorney, Agent, or Firm*—Staas & Halsey LLP

(57) ABSTRACT

An optical modulator of the invention includes a substrate having an optical waveguide and an electric waveguide formed therein, a driving circuit that generates a modulation electric signal, a relay circuit that gives the modulation electric signal to the electric waveguide via an electric filter circuit made of a capacitor and a resistor, and a terminal resistor that terminates the modulation electric signal that has propagated through the electric waveguide. The sum of the impedance of the electric filter circuit and the resistance of the terminal resistor is set to be substantially equal to the impedance of the driving circuit. Also, the resistance of the terminal resistor is set to be substantially equal to the characteristic impedance of the electric waveguide. Then, deterioration of the electric reflection characteristic in a low-frequency region can be restrained even if the frequency characteristic of the optical response is flattened and leveled by application of the electric filter circuit.

7 Claims, 8 Drawing Sheets

EXAMPLE OF THE TRANSMITTANCE
CHARACTERISTIC OF A FILTER CIRCUIT

WHEN R1=20Ω, C1=3pF, $R_T$=45Ω, Z=45Ω

WHEN R1=20Ω, C1=3pF, $R_T$=40Ω, Z=40Ω

WHEN R1=20Ω, C1=3pF, $R_T$=35Ω, Z=35Ω

WHEN R1=20Ω, C1=3pF, $R_T$=30Ω, Z=30Ω

WITH NO FILTER CIRCUIT
($10Gbps$, $R_T=50\Omega$, $Z=50\Omega$)

WITH A FILTER CIRCUIT
($10Gbps$, $R1=20\Omega$, $C1=3pF$, $R_T=50\Omega$, $Z=50\Omega$)

OPTICAL MODULATOR

BACKGROUND OF THE INVENTION (1) Field of the Invention

The present invention relates to an optical modulator that modulates the intensity or the phase of light by using the electro-optical effect, and particularly to an optical modulator provided with an electric filter circuit for flattening and leveling the frequency characteristic of optical response.

(2) Related Art

A conventional optical modulator is configured, for example, as shown in FIG. 11. Referring to FIG. 11, an optical waveguide 101 of Mach-Zehnder type and an electric waveguide (progressive wave electrode) 102 for controlling the relative phase of each light that propagates through the two parallel arm sections 101A, 101B of the optical waveguide 101 are formed on a substrate 100 having an electro-optical effect. By applying a modulation electric signal S supplied from a driving circuit 110 to one end of the electric waveguide 102, the refractive index of one arm section 101A of the optical waveguide 101 is controlled and, by changing the optical path length difference between the two arm sections 101A, 101B, optical modulation of the input light $L_{IN}$ is realized. With this conventional optical modulator, the other end of the electric waveguide 102 is terminated by a resistor $R_T$, and a DC bias $V_B$ for controlling the relative phase shift amount between the two arm sections 101A, 101B is applied to the other end of the electric waveguide 102 via a bias tee circuit 120. Such a conventional optical modulator using the electro-optical effect is used, for example, in an optical transmission system that performs a high-speed long-distance optical communication.

For the conventional optical modulator such as described above, in order to obtain output light $L_{OUT}$ modulated in a more preferable state, flatness of the optical response band of the optical modulator is required in a frequency region contained in the modulation electric signal. However, the driving voltage needed for realizing a suitable optical modulation and the optical response band are in a trade-off relationship with each other. Therefore, as one of the conventional techniques for restraining the rise of the driving voltage and realizing the widening of the optical response band, a configuration using a filter circuit that compensates for the dependency of modulation efficiency on the frequency, for example, is known in the art (See, for example, Japanese Patent Application Laid-Open (JP-A) No. 2002-287103).

FIG. 12 is a view showing a configuration example of a conventional optical modulator using the above-described filter circuit. In this optical modulator, a filter circuit 130 made of a capacitor C1 and a resistor R1 that are connected in parallel, for example, is inserted between the driving circuit 110 and one end of the electric waveguide 102. Typically, a chip capacitor and a thin film resistor, or a chip capacitor and a chip resistor are used as the capacitor C1 and the resistor R1.

FIG. 13 exemplifies a frequency characteristic of the reflection coefficient (S11) of an electric circuit and a frequency characteristic of the optical response in a conventional optical modulator. The top view shows a case with no filter circuit, which corresponds to the configuration of FIG. 11, and the bottom view shows a case with a filter circuit, which corresponds to the configuration of FIG. 12. Here, a driving circuit 110 of 50 Ω series is used at a bit rate of 10 Gbps, and the terminal resistance $R_T$ and the characteristic impedance Z of the electric waveguide 102 are respectively set to be 50 Ω which is equal to the impedance of the above driving circuit 110.

In order to realize a high-speed operation and a low-voltage operation in an optical modulator with no filter circuit, the length of the progressive wave electrode 102 must be sufficiently increased; however, in such a progressive wave electrode 102, it is difficult to realize a flat optical response characteristic, as shown in the right top view of FIG. 13, due to the influence of the attenuation of the microwave caused by the surface skin effect. Therefore, by attenuating the low-frequency component of the modulation electric signal S with the use of a filter circuit 130, the flatness of the optical response characteristic in a desired frequency band (for example, a frequency band of at most a little more than the half of the bit rate in a general NRZ modulation) is improved, as shown in the right bottom view of FIG. 13. In other words, a wide optical response band is realized.

However, with a conventional optical modulator such as shown in the above FIG. 12, by providing a filter circuit 130 having a transmittance characteristic that attenuates a low-frequency component, rise in the impedance of the whole electric circuit in the low-frequency region is invited, thereby provoking the deterioration of the electric reflection characteristic (S11), as shown in the left bottom view of FIG. 13. This deterioration in the electric reflection characteristic causes a multiple reflection of the electric signal, for example, between the driving circuit 110 and the filter circuit 130, thereby giving an adverse effect on the optical modulation operation.

As a countermeasure against such deterioration of the electric reflection characteristic in the low-frequency region, the above-mentioned prior art discloses a configuration in which a constant-resistance filter circuit 130' is formed by connecting a shunt resistor $R_S$ to the parallel circuit made of the capacitor C1 and the resistor R1, so as to reduce the S11 in the low-frequency region, as shown, for example, in FIG. 14. However, such a constant-resistance filter circuit 130' not only invites a complex configuration but also raises the following problem.

In other words, in driving of the optical modulator with the use of the electro-optical effect, a DC bias $V_B$ must be applied to the electric waveguide 102 as described above. However, when the above constant-resistance filter circuit 130' is inserted, the DC bias $V_B$ cannot be efficiently applied to the electric waveguide 102, due to the presence of the shunt resistor $R_S$. For this reason, in the configuration example shown in FIG. 14, an electrode 102' for applying the DC bias $V_B$ is formed on the substrate 100, separately and independently from the electric waveguide 102 to which the modulation electric signal S' is applied. This raises a problem of increase in the size of the optical modulator.

In addition, in a conventional optical modulator such as described above, a chip capacitor and a chip resistor are used as the components constituting the filter circuits 130, 130'. This leads to a disadvantage of inviting deterioration of the characteristic in a high frequency, aggravation of the producibility such as mounting a chip component, increase in the size of the filter circuits.

SUMMARY OF THE INVENTION

The invention has been made in view of the above circumstances, and an object thereof is to provide a small optical modulator that can restrain the deterioration of the electric reflection characteristic in a low-frequency region with a simple circuit configuration with certainty even if an electric filter circuit is applied to a modulation electric signal for flattening and leveling the frequency characteristic of optical response.

In order to achieve the above-mentioned object, an optical modulator of the invention includes: a substrate having an electro-optical effect; optical modulation means having an optical waveguide and an electric waveguide disposed along at least one part of the optical waveguide; relay means having an electric line that guides a modulation electric signal that is output from driving means to the electric waveguide and an electric filter circuit inserted on the electric line; and terminal means that terminates the modulation electric signal that has propagated through the electric waveguide. This optical modulator is characterized in that a sum of an impedance of the electric filter circuit and an impedance of the terminal means is substantially equal to an impedance of the driving means, and in that an impedance of the terminal means is substantially equal to a characteristic impedance of the electric waveguide.

With the optical modulator having a configuration such as described above, a modulation electric signal that is output from the driving means is guided to the electric waveguide of the optical modulation means via the relay means. In the optical modulation means, the refractive index of the optical waveguide is controlled by the electro-optical effect based on the modulation electric signal given to the electric waveguide, thereby the light that propagates through the optical waveguide is modulated. In this optical modulation operation, the modulation electric signal that is given to the electric waveguide is processed by the electric filter circuit disposed on the electric line of the relay means, so that the frequency characteristic of the optical response in the optical modulation means is flattened and leveled, in the same manner as in the above-described prior art. In addition, simultaneously with this, by setting a sum of an impedance of the electric filter circuit and an impedance of the terminal means to be substantially equal to an impedance of the driving means, namely, by setting the impedance of the terminal means to be smaller than the impedance of the driving means in accordance with the impedance of the electric filter circuit, and also by setting an impedance of the terminal means to be substantially equal to a characteristic impedance of the electric waveguide, the deterioration of the electric reflection characteristic in the low-frequency region, which conventionally raised a problem in the prior art, will be reduced.

Thus, the invention can realize a small optical modulator having a simple configuration that can improve the electric reflection characteristic in the low-frequency region while maintaining the frequency characteristic of the optical response to be flat by applying an electric filter circuit.

The other objects, features, and advantages of the invention will become apparent from the following description of embodiments related to the appended drawings.

DETAILED DESCRIPTION OF THE INVENTION

Best modes for carrying out an optical modulator of the invention will be described hereinbelow with reference to the appended drawings. Here, identical or corresponding parts will be denoted with the same symbols all throughout the drawings.

Figure 1:
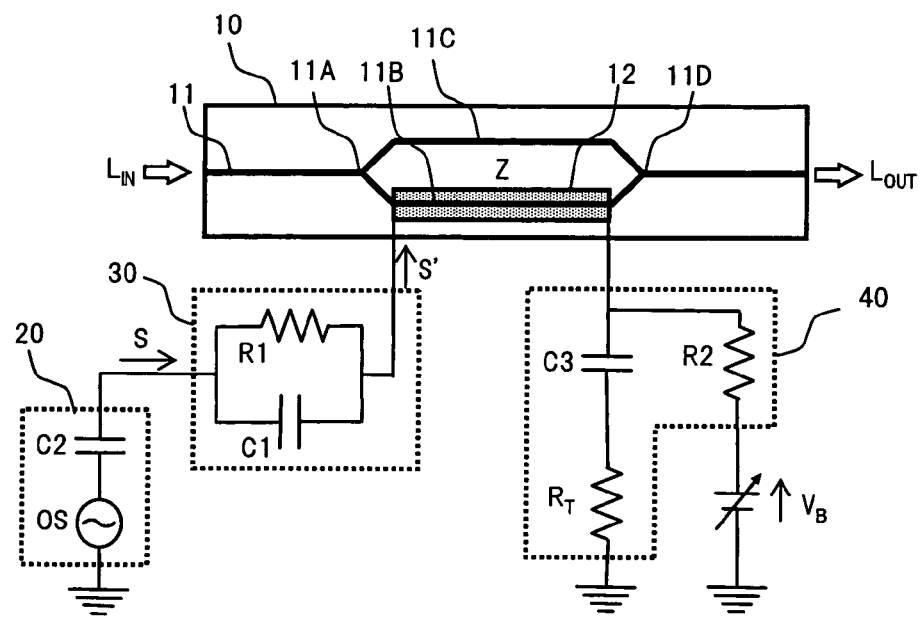
FIG. 1 is a configuration view showing one embodiment of an optical modulator according to the invention.

FIG. 1 is a configuration view showing one embodiment of an optical modulator according to the invention.

Referring to FIG. 1, the optical modulator of this embodiment is configured to include, for example, a substrate 10 on which an optical waveguide 11 and an electric waveguide 12 are formed as optical modulation means, a driving circuit 20 serving as driving means for generating a modulation electric signal S, a relay substrate 30 serving as relay means for guiding the modulation electric signal S that is output from the driving circuit 20 to the electric waveguide 12 disposed on the substrate 10, and a terminal substrate 40 for terminating the electric signal that has propagated through the electric waveguide 12.

The substrate 10 is made, for example, of a material having an electro-optical effect, such as lithium niobate (LiNbO$_3$). An optical waveguide 11 of Mach-Zehnder type is formed on the surface or in the inside thereof. The optical waveguide 11 includes an optical branching section 11A that branches the continuous light $L_{IN}$ input from one end surface of the substrate 10 into two, two parallel arm sections 11B, 11C to which the light beams branched into two by the optical branching section 11A are respectively given, and an optical synthesis section 11D that synthesizes the light beams propagated through the two arm sections 11B, 11C and outputs the synthesized light through the other end surface of the substrate 10. An electric waveguide (progressive wave electrode) 12 is formed on one arm section 11B of this optical waveguide 11. One end of the electric waveguide 12 located on the beam input side is electrically connected to the relay substrate 30, and the other end located on the beam output side is electrically connected to the terminal substrate 40. The characteristic impedance Z of this electric waveguide 12 is set in advance to be substantially equal to the resistance of the later-mentioned terminal resistor $R_T$ disposed on the terminal substrate 40.

The driving circuit 20 has, for example, an oscillator OS and a capacitor C2 to generate a modulation electric signal S in accordance with a modulation method and a bit rate as desired, and outputs the modulation electric signal S to the relay substrate 30. This driving circuit 20 is assumed to have, for example, an impedance of 50 Ω or the like. However, the impedance of the diving circuit 20 in the invention is not limited to 50 Ω alone, so that an arbitrary driving circuit having any impedance can be used as well.

Figure 12:
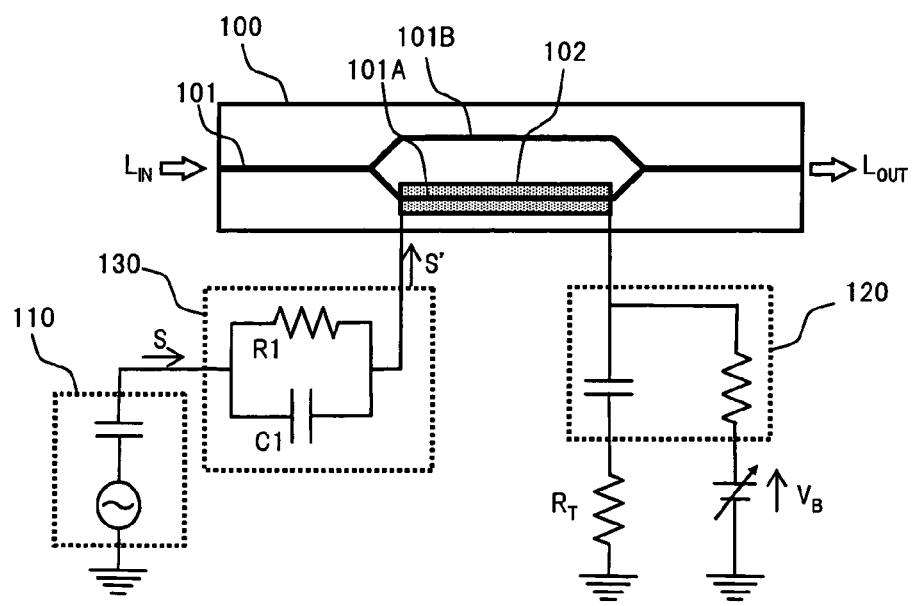
FIG. 12 is a configuration view showing one example of a conventional optical modulator to which an electric filter circuit is applied for flattening and leveling the optical response characteristic.

The relay substrate 30 includes an electric filter circuit capable of attenuating the low-frequency component of the modulation electric signal that is output from the driving circuit 20, thereby the modulation electric signal S' that has passed through the electric filter circuit is given to one end of the electric waveguide 12 on the substrate 10. Specifically, this relay substrate 30 is configured to include a parallel filter circuit of C and R, for example, by forming an electric line such as a microstrip line or a coplanar line on a ceramic substrate and further forming a capacitor C1 and a resistor R1 on a signal electrode that is provided in the midway of the electric line. The capacitance of the capacitor C1 and the resistance of the resistor R1 are determined in advance so as to flatten and level the optical response characteristic in a frequency band that is set in accordance with the bit rate of the modulation electric signal, in the same manner as in the above-described prior art shown in FIG. 12.

Figure 2:
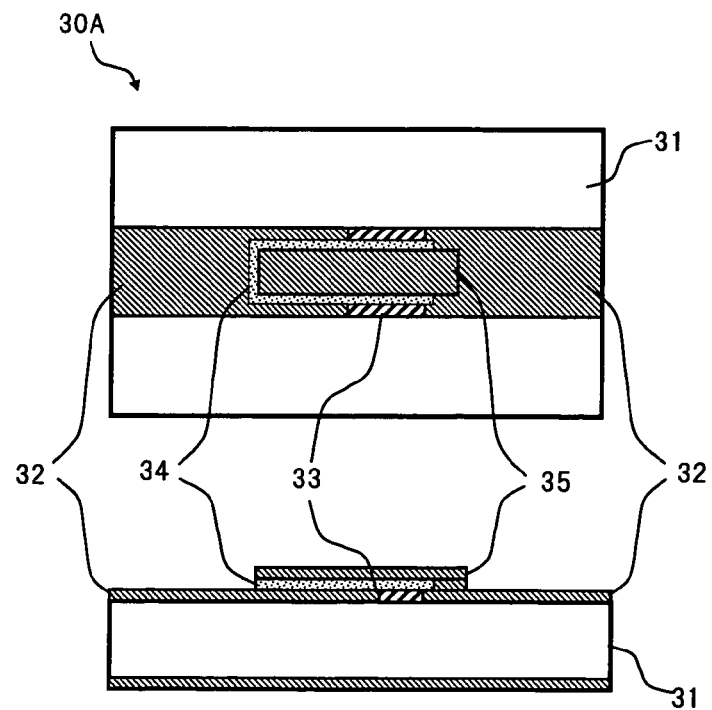
FIG. 2 is a view showing one specific configuration example of a relay substrate used in the above embodiment.
Figure 3:
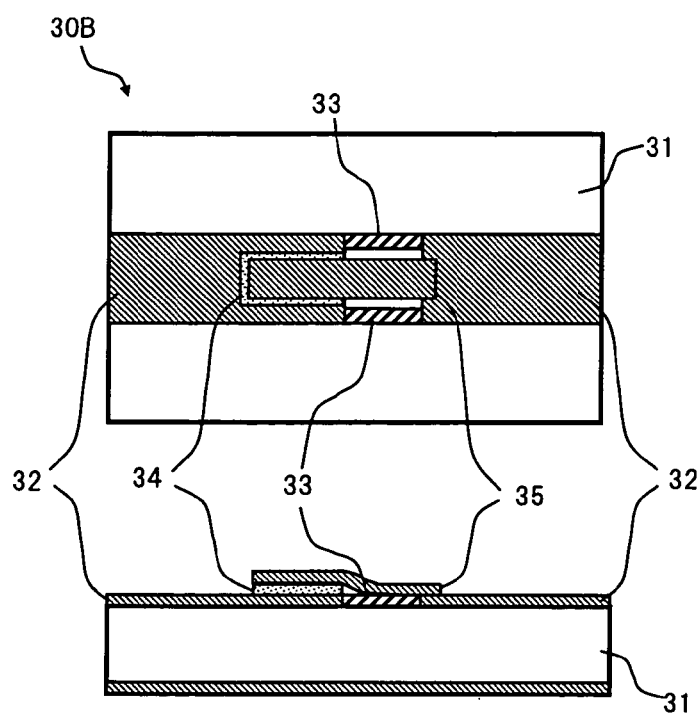
FIG. 3 is a view showing another specific configuration example of a relay substrate used in the above embodiment.
Figure 4:
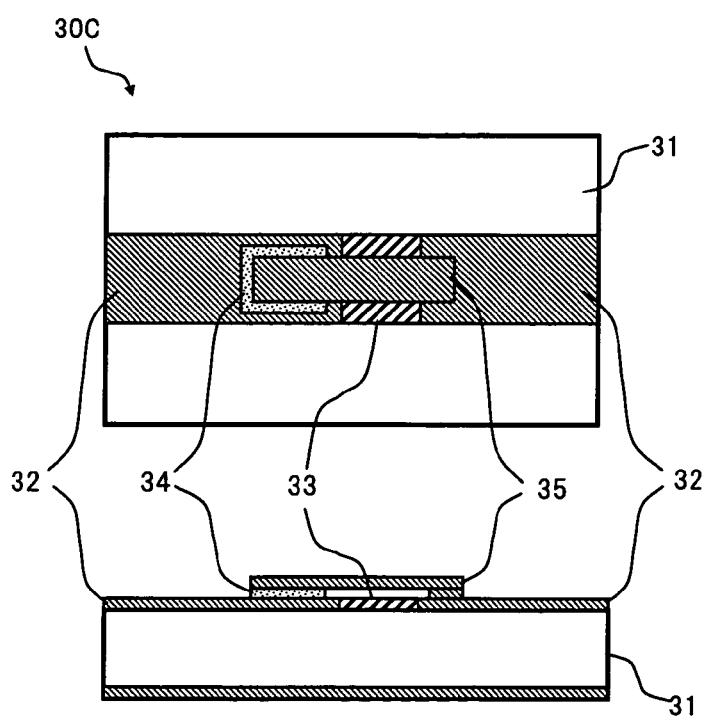
FIG. 4 is a view showing still another specific configuration example of a relay substrate used in the above embodiment.

FIGS. 2 to 4 are views that site specific configuration examples of the above-described relay circuit 30.

A relay substrate 30A shown in FIG. 2 is configured, for example, as follows. A thin film resistor 33 made of $Ti_2N$ or the like is formed in the midway of a strip-shaped electric line 32 that is formed on a ceramic substrate 31, and this thin film resistor 33 constitutes the resistor R1 of the parallel filter circuit shown in FIG. 1. Also, an insulation film 34 made of $SiO_2$ or the like is formed on the thin film resistor 33 and on a part of the electric line 32 adjacent to one end of the thin film resistor 33. Further, on the top surface of the insulation film 34, a gold (Au) electrode 35 that is short-circuited to the electric line 32 adjacent to the other end of the thin film resistor 33 is formed. By sandwiching the insulation film 34 between the electric line 32 and the gold electrode 35, the capacitor C1 of the parallel filter circuit shown in FIG. 1 is configured. The parallel filter circuit of C and R thus configured can be produced more easily than a conventional configuration using chip components, and also can realize an excellent high-frequency characteristic. However, it is to be noted that the characteristic may be shifted from that of an ideal parallel filter circuit of C and R because a capacitive coupling may be generated between the thin film resistor 33 and the gold electrode 35 formed on the insulation film 34.

The relay substrate 30B shown in FIG. 3 is an application example in which, in order to reduce the aforementioned capacitive coupling, the thin film resistor 33 in the configuration of FIG. 2 is divided into two parts so that the thin film resistor may not be formed on a part located under the gold electrode 35. In this relay substrate 30B, the insulation film 34 is formed only on the electric line 32, and the gold electrode 35 formed on the top surface of the insulation film 34 is short-circuited to the electric line 32 by passing over the substrate 31. According to such a configuration, one can obtain a characteristic close to that of an ideal parallel filter of C and R. However, this configuration has a drawback in that, since it is difficult to lower the resistance of the thin film resistor 33, the degree of freedom in designing the parallel filter circuit of C and R is low.

The relay substrate 30C shown in FIG. 4 is an application example in which, with the configuration of FIG. 2, the insulation film 34 is formed only on a part of the electric line 32 adjacent to one end of the thin film resistor 33 so that the insulation film 34 may not be formed on the thin film resistor 33. According to such a configuration, a characteristic close to that of an ideal parallel filter circuit of C and R can be obtained by reducing the above-mentioned capacitive coupling while maintaining the degree of freedom in designing the resistance of the thin film resistor 33.

The terminal substrate 40 includes a terminal resistor $R_T$ serving as terminal means for terminating the modulation electric signal S' that has propagated through the electric waveguide 12 on the substrate 10 and a bias tee circuit made of a resistor R2 and a capacitor C3 for applying the DC bias $V_B$ supplied from a direct-current power source to the electric waveguide 12. The resistance of the terminal resistor $R_T$ is set in advance so that the sum of the resistance of the terminal resistor $R_T$ and the impedance of the electric filter circuit formed on the relay substrate 30 may be substantially equal to the impedance of the driving circuit 20. In other words, the resistance of the terminal resistor $R_T$ is set to be smaller than the impedance of the driving circuit 20 in accordance with a designed value of the impedance of the electric filter circuit. This resistance of the terminal resistor $R_T$ serves as a standard value for designing the characteristic impedance Z of the electric waveguide 12 that is formed on the substrate 10, as described before. Preferably, the electric waveguide 12 is designed so that the resistance of the terminal resistor $R_T$ will be equal to the characteristic impedance Z of the electric waveguide 12.

Next, an operation of this embodiment will be described.

With an optical modulator having a configuration such as described above, input light $L_{IN}$ given to one end of the optical waveguide 11 on the substrate 10 is branched into two by the optical branching section 11A to be respectively sent to the arm sections 11B, 11C. The light that propagates through each of the arm sections 11B, 11C is controlled in its relative phase by a change in the refractive index of the arm section 11B in accordance with the modulation electric signal S' that is applied to the electric waveguide 12, and is synthesized in the optical synthesis section 11D. This allows that the output light $L_{OUT}$ that has been modulated in its intensity in accordance with the modulation electric signal S' is output through the other end of the optical waveguide 11.

Figure 5:
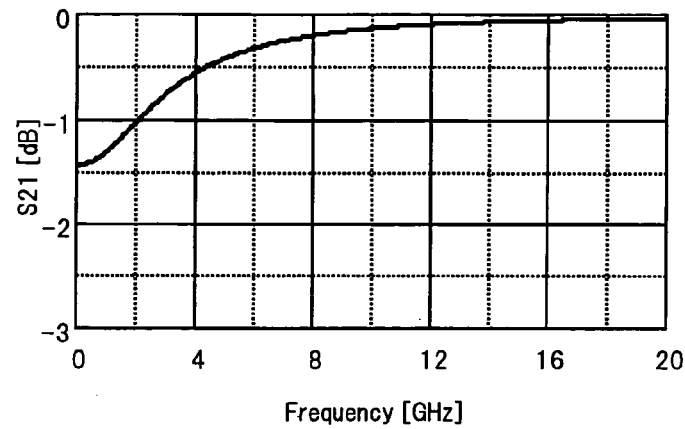
FIG. 5 is a view showing one example of the electric transmittance characteristic of a filter circuit used in the above embodiment.

In such an optical modulation operation, the modulation electric signal S' that is applied to the electric waveguide 12 is, for example, a signal obtained by attenuating a low-frequency component of the modulation electric signal S that is output from the driving circuit 20 with an electric filter circuit having an electric transmittance characteristic (S21) such as shown in FIG. 5, so that an optical response characteristic that is flattened and leveled with regard to a desired frequency band can be obtained. Here, the transmittance characteristic shown in FIG. 5 shows one example of a parallel filter circuit of C and R that is applied to a modulation electric signal S of 10 Gbps, so that the transmittance characteristic of an electric filter circuit used in the invention is not limited to the above example alone.

Also, the deterioration of the electric reflection characteristic in a low frequency region, which raised a problem in the prior art, can be reduced by setting the resistance of the terminal resistor $R_T$ to be lower than 50 Ω of conventional setting so that the sum of the impedance of the parallel filter circuit of C and R and the resistance of the terminal resistor $R_T$ will be substantially equal to the impedance (for example, 50 Ω) of the driving circuit 20, and also by designing the characteristic impedance Z of the electric waveguide 12 to be substantially equal to the resistance of the terminal resistor $R_T$.

FIGS. 6 to 9 exemplify the electric reflection characteristic (S11) and the optical response characteristic respectively relative to the frequency in correspondence with specific designed values of the resistance of the terminal resistor $R_T$ and the impedance Z of the electric waveguide 12. Here, the driving circuit 20 of 50 Ω series is used at a bit rate of 10 Gbps; the capacitor C1 of the parallel filter circuit is set to have a capacitance of 3 pF; and the resistor R1 is set to have a resistance of 20 Ω.

Figure 6:
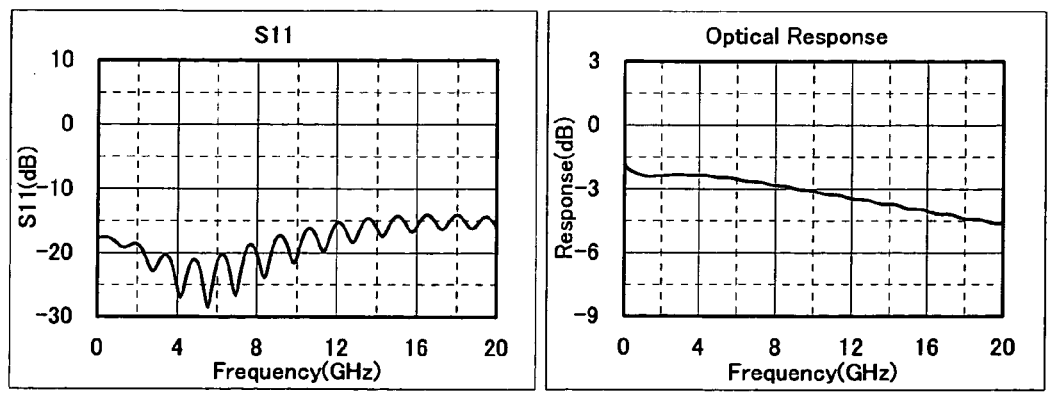
FIG. 6 is a view showing one example of the electric reflection characteristic and the optical response characteristic when the terminal resistance and the impedance of an electric waveguide are set to be 45 Ω in the above embodiment.
Figure 7:
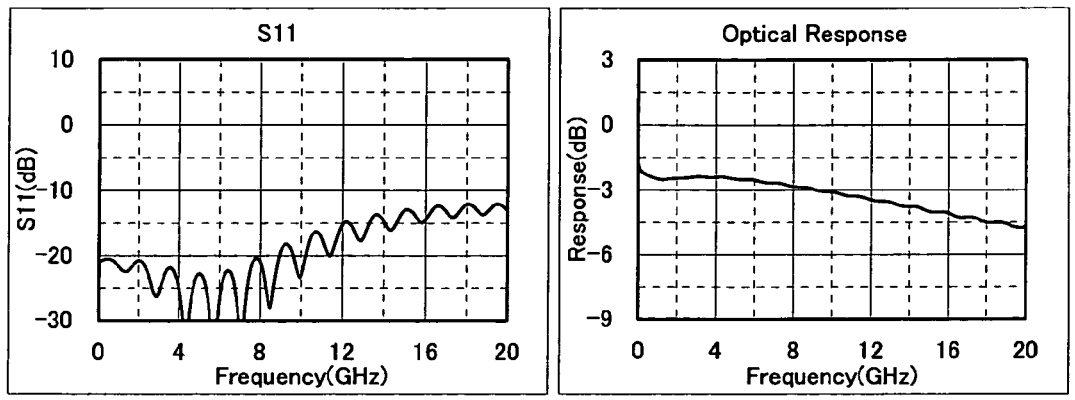
FIG. 7 is a view showing one example of the electric reflection characteristic and the optical response characteristic when the terminal resistance and the impedance of an electric waveguide are set to be 40 Ω in the above embodiment.
Figure 8:
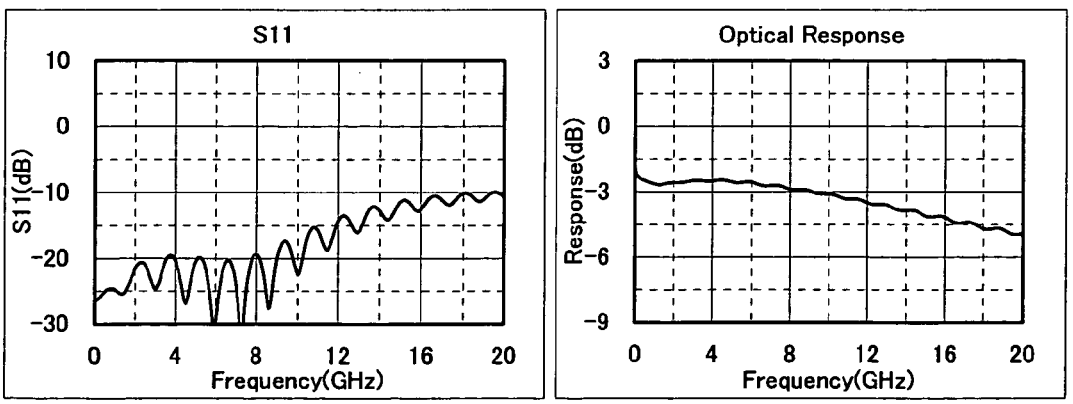
FIG. 8 is a view showing one example of the electric reflection characteristic and the optical response characteristic when the terminal resistance and the impedance of an electric waveguide are set to be 35 Ω in the above embodiment.
Figure 9:
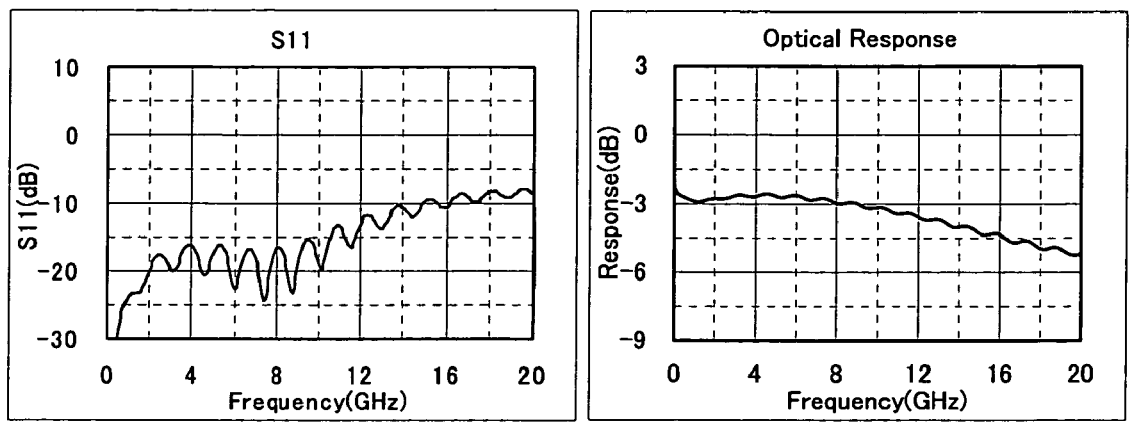
FIG. 9 is a view showing one example of the electric reflection characteristic and the optical response characteristic when the terminal resistance and the impedance of an electric waveguide are set to be 30 Ω in the above embodiment.
Figure 13:
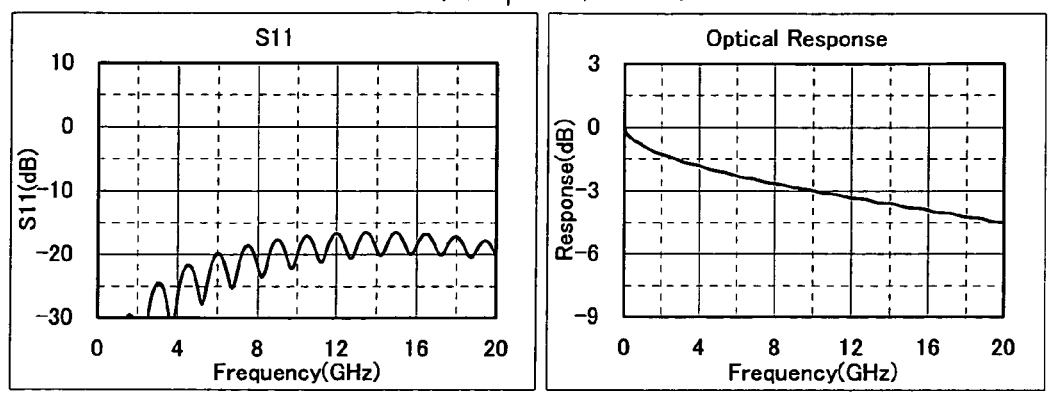
FIG. 13 is a view showing one example of the electric reflection characteristic and the optical response characteristic of a conventional optical modulator.
Figure 13:
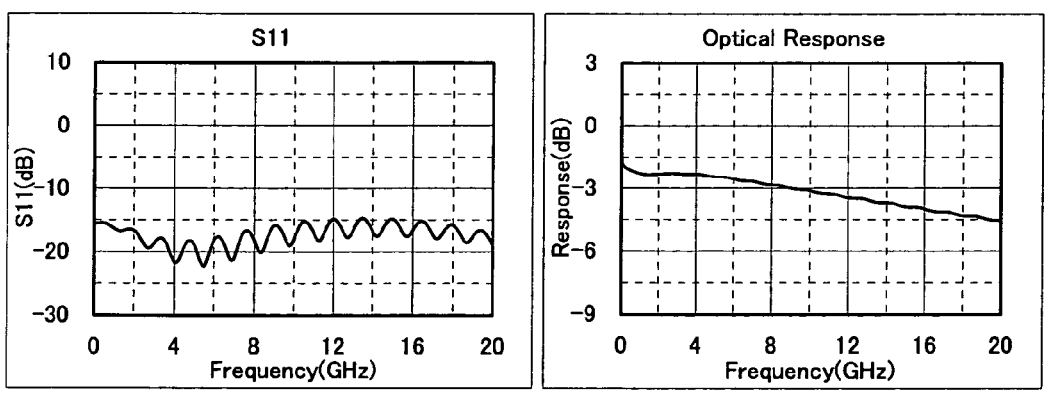

Comparing the characteristics shown in FIG. 6 in which the resistance of the terminal resistor $R_T$ and the impedance of the electric waveguide 12 are set to be 45 Ω, the characteristics shown in FIG. 7 in which they are set to be 40 Ω, the characteristics shown in FIG. 8 in which they are set to be 35 Ω, and the characteristics shown in FIG. 9 in which they are set to be 30 Ω respectively with the case of a conventional configuration ($R_T$=Z=50 Ω) shown in the bottom view of FIG. 13 described above, one will understand that the electric reflection characteristic in the low frequency region has been improved while maintaining the frequency characteristic of optical response to be flat and level. Therefore, a good optical response characteristic and a good electric reflection characteristic will be compatible by setting the resistance of the terminal resistor $R_T$ and the impedance Z of the electric waveguide 12 to be within a range of about 30 to 45 Ω under a set condition such as described above.

Thus, the optical modulator of this embodiment produces the following effects. Namely, the frequency characteristic of optical response can be flattened and leveled by converting the modulation electric signal S that is output from the driving circuit 20 into a modulation electric signal S' having a low frequency component attenuated by an electric filter circuit formed on the relay substrate 30, and giving the converted modulation electric signal S' to the electric waveguide 12 on the substrate 10. Also, the electric reflection characteristic in the low frequency region can be improved by setting the resistance of the terminal resistor $R_T$ to be lower than the impedance of the driving circuit 20 in accordance with the impedance of the electric filter circuit and also by setting the characteristic impedance Z of the electric waveguide 12 to be substantially equal to the resistance of the terminal resistor $R_T$.

Figure 14:
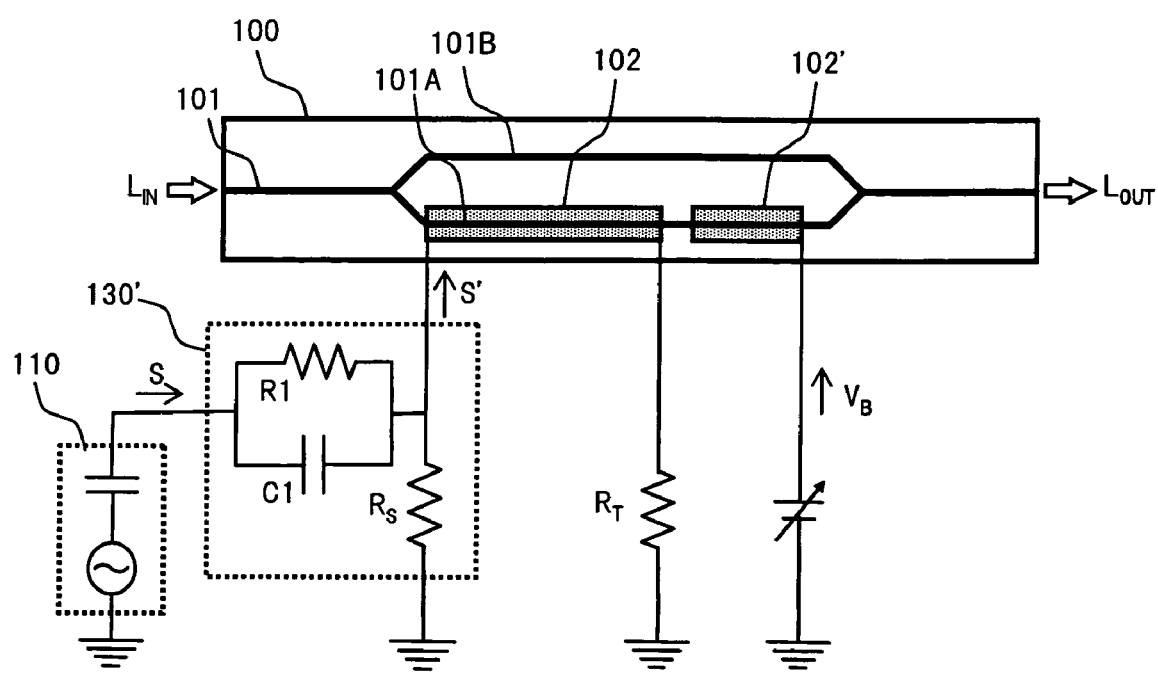
FIG. 14 is a configuration view showing one example of a conventional optical modulator in which a shunt resistance is provided in the electric filter circuit.

In addition, unlike the above-described case shown in FIG. 14 that uses a shunt resistor $R_S$, the DC bias $V_B$ can be applied to the electric waveguide 12 through which the modulation electric signal S' propagates, so that the optical modulator can have a reduced scale. Furthermore, by applying a configuration such as shown in FIGS. 2 to 4, a small filter circuit having an excellent high-frequency characteristic and a good producibility can be realized.

Figure 10:
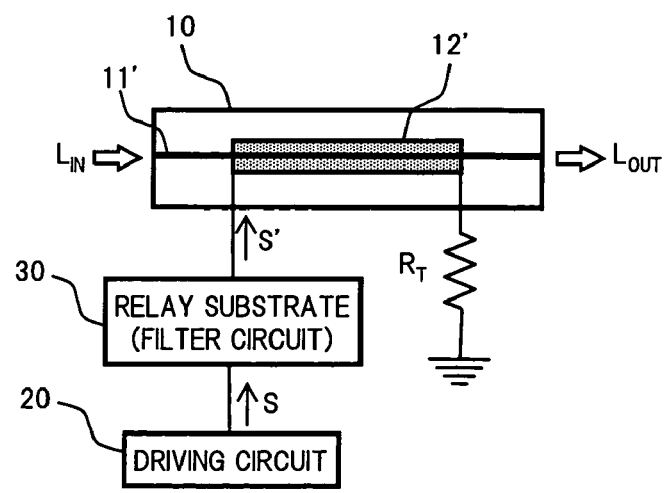
FIG. 10 is a view showing a configuration example when the invention is applied to a phase modulator in relation to the above embodiment.
Figure 11:
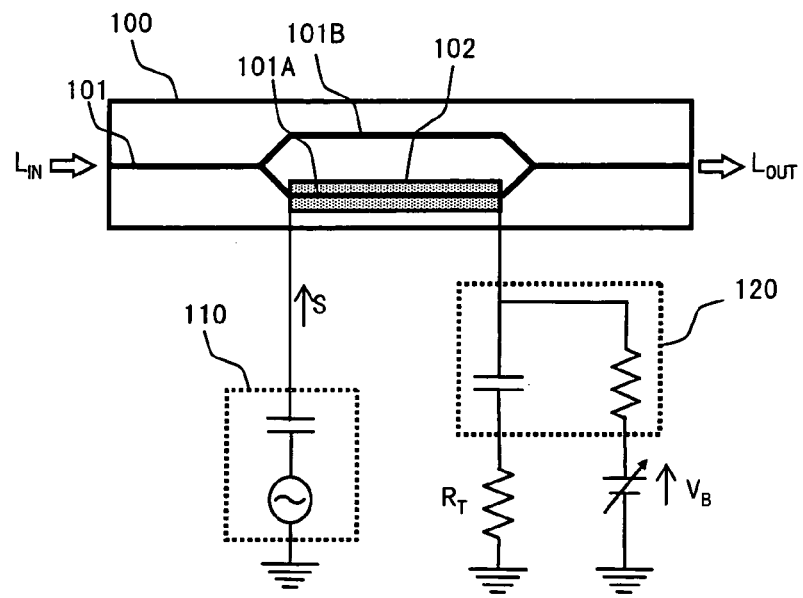
FIG. 11 is a configuration view showing one example of a conventional optical modulator.

Here, the above-described embodiment shows a configuration example in which an electric waveguide is provided for one arm section of a Mach-Zehnder type optical waveguide formed on a substrate having an electro-optical effect. However, the invention can also be applied to a configuration in which an electric waveguide is provided respectively for both of the arm sections, in the same manner as in the above-described embodiment. Also, the above-described embodiment shows a case in which the input light $L_{IN}$ is subjected to intensity modulation with the use of a Mach-Zehnder type optical waveguide. However, referring to FIG. 10, the invention is effective also in a configuration in which the input light $L_{IN}$ is subjected to phase modulation by forming an electric waveguide 12' along one optical waveguide 11' formed on a substrate having an electro-optical effect.

Moreover, the above-described embodiment shows an example in which a low-frequency component of a modulation electric signal S is attenuated by using a parallel filter circuit made of a capacitor C1 and a resistor R1. However, the electric filter circuit applied to the invention is not limited to the above example alone, so that an electric filter circuit having a known configuration and being effective for flattening and leveling the frequency characteristic of optical response can be applied.

What is claimed is:

1. An optical modulator comprising:
a substrate having an electro-optical effect;
an optical modulation module having an optical waveguide and an electric waveguide disposed along at least one part of the optical waveguide;
a relay having an electric line that guides a modulation electric signal that is output from a driver to said electric waveguide and an electric filter circuit inserted on the electric line; and
a terminal that terminates the modulation electric signal that has propagated through said electric waveguide, wherein
a sum of an impedance of said electric filter circuit and an impedance of said terminal is substantially equal to an impedance of said driver, and an impedance of said terminal is substantially equal to a characteristic impedance of said electric waveguide.

2. An optical modulator of claim 1,
wherein an electric transmittance characteristic of said electric filter circuit is a characteristic that flattens and levels an optical response characteristic of said optical modulation module in a frequency band that is set in accordance with a bit rate of said modulation electric signal.

3. An optical modulator of claim 2,
wherein said electric filter circuit is made of a circuit having a capacitor and a resistor that are connected in parallel, so as to attenuate a low-frequency component of the modulation electric signal that is output from said driver.

4. An optical modulator of claim 3,
wherein said capacitor and said resistor are formed with a plurality of thin films disposed on said electric line.

5. An optical modulator of claim 1,
wherein an impedance of said terminal and a characteristic impedance of said electric waveguide are designed to be within a range of 30 to 45 Ω when an impedance of said driver is 50 Ω.

6. An optical modulator of claim 1,
wherein said optical modulation module modulates an intensity or a phase of light that propagates through said optical waveguide.

7. A method of modulating an optical signal, comprising:

splitting an input optical signal so that at least one part of the input optical signal passes through an optical waveguide along an electric waveguide on a substrate having an electro-optical effect;

modulating the at least one pad of the input optical signal by applying a modulation electrical signal to the electric waveguide, the modulation electrical signal being received from a driver circuit through an electric filter; and terminating the modulation electric signal with a terminal impedance substantially equal to a characteristic impedance of said electric waveguide, wherein a sum of an impedance of said electric filter circuit and the terminal impedance is substantially equal to an impedance of the driver circuit.

* * * * *

UNITED STATES PATENT AND TRADEMARK OFFICE
CERTIFICATE OF CORRECTION

PATENT NO. : 7,263,244 B2 Page 1 of 1
APPLICATION NO. : 11/320699
DATED : August 28, 2007
INVENTOR(S) : Takehito Tanaka et al.

It is certified that error appears in the above-identified patent and that said Letters Patent is hereby corrected as shown below:

Column 9, Line 10, change "pad" to --part--.

Signed and Sealed this

Twenty-fifth Day of December, 2007

JON W. DUDAS
*Director of the United States Patent and Trademark Office*

UNITED STATES PATENT AND TRADEMARK OFFICE
CERTIFICATE OF CORRECTION

PATENT NO. : 7,263,244 B2 Page 1 of 1
APPLICATION NO. : 11/320699
DATED : August 28, 2007
INVENTOR(S) : Takehito Tanaka et al.

It is certified that error appears in the above-identified patent and that said Letters Patent is hereby corrected as shown below:

Column 9, Line 10, change "pad" to --part--.

Signed and Sealed this

Eighth Day of January, 2008

JON W. DUDAS
*Director of the United States Patent and Trademark Office*